United States Patent

[11] 3,577,655

| | | |
|---|---|---|
| [72] | Inventor | Edward G. Pancoe<br>Chenango Forks, N.Y. |
| [21] | Appl. No. | 825,652 |
| [22] | Filed | May 19, 1969 |
| [45] | Patented | May 4, 1971 |
| [73] | Assignee | Singer-General Precision, Inc.<br>Binghamton, N.Y. |

[54] MOTION SIMULATOR
5 Claims, 5 Drawing Figs.

[52] U.S. Cl.................................................... 35/12,
214/1, 248/377
[51] Int. Cl..................................................... G09b 9/08,
F16m 11/32
[50] Field of Search.......................................... 35/12;
187/8.71, 8.72; 214/1 (A,D); 248/163, 371, 376,
377, 396, 397; 254/10.2, 10.6, 91, 122

[56] References Cited
UNITED STATES PATENTS
2,358,016 9/1944 Link et al...................... 35/12
2,637,449 5/1953 Hamer............................ 214/1
2,787,842 4/1957 Smith et al..................... 35/12

*Primary Examiner*—Robert W. Michell
*Assistant Examiner*—Paul V. Williams
*Attorneys*—Francis L. Masselle, William Grobman and Charles S. McGuire ABSTRACT: A motion system for a vehicle simulator, or the like, of the type wherein independent, extensible actuators are provided for moving the motion platform in each single axis of freedom relative to a fixed base. The present invention provides such a system with greatly improved excursion limits and simultaneous motion in more than one axis (by simultaneous movement of more than one actuator) by erecting the platform and linkage from a settled to a reference position through the use of an additional actuator which is not used for movement of the platform during operation of the system. The arrangement also allows actuator power to be turned off with the platform in a level, settled position without the use of gates or blocks normally required in motion systems of the independent type.

MOTION SIMULATOR

The present invention relates to motion simulators of the type commonly utilized to provide controlled movement within specified limits to a rigid platform which may carry the student station of a vehicle simulator, or the like.

Vehicle simulator-training apparatus in current use normally includes a system for providing to the student station controlled velocities and accelerations, representative of the type likely to be encountered in operation of the actual vehicle. The training value derived from the simulator is thereby greatly enhanced by duplicating to some extent the sensory stimuli experienced in an actual vehicle of the type simulated. Motion is commonly provided to the student station by controlled actuation of rigid elements, such as linear actuators and the like. Such systems may be generally classified as being either of the synergistic type, wherein the movement of all actuators is required to produce movement of the student station in any one axis of freedom, or of the cascaded or independent type, wherein only one actuator need be moved to provide motion in any single axis of freedom. These two types of motion systems each have certain advantages and disadvantages, the selection of one type or the other depending upon the desired performance and physical design limitations placed on the system.

The present invention is concerned with motion systems of the independent type having a plurality of motion actuators, each providing movement of the student station in or about a distinct axis of freedom. Movement of the several actuators may be superimposed (i.e., effected simultaneously) to produce more complex motions in more than 1° of freedom at any given time. The principal object of the invention is to provide a motion simulator of the independent type incorporating the usual advantages of such type of motion system while overcoming certain disadvantages and providing advantages normally associated with synergistic motion simulators.

The unique mechanical arrangement by which the foregoing object is realized includes the provision of a supported pivot at the intersection of two axes about which the student station may be moved. This pivot is in a fixed position when the system is operative, but additional means are provided for moving the pivot point to a rest, or settled position wherein the motion actuators may be moved to their fully retracted positions and power to the system turned off with the student station in a level, settled position. Although this has previously been possible with certain types of synergistic motion simulators it has been necessary to provide additional structure in the nature of blocks or gates to support the student station of independent type motion simulators when the power to the actuators is turned off.

An additional object of the invention is to provide a motion simulator of the independent actuator type having a mechanical arrangement allowing greater excursions of the student station with shorter stroke cylinders. The novel arrangement also provides a greater "tread", or better moment arm, and hence a more stable platform for carrying the student station.

Other object of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which.

Prior art motion systems of the synergistic type are typified by the motion simulator shown in U.S. Pat. No. 3,295,224, and those of the independent or cascaded type by U.S. Pat. Nos. 2,930,144 and 3,281,962, among others. Motion simulators of both types are commonly provided as an integral portion of many aircraft flight simulators, and similar training apparatus, and operate with the motion actuators under the control of appropriate analog or digital computer means. The present invention is likewise intended to be operated with linear actuators which may be identical in construction and operation with those disclosed in prior publications, such as the patents mentioned above. Therefore, in the interest of clarity and brevity the present disclosure will be limited to the mechanical configuration with which the invention is primarily concerned, it being understood that appropriate servomechanisms, followup devices, computer hardware and software, and other such operational elements may be provided in accordance with prior art teachings.

Figure 1:
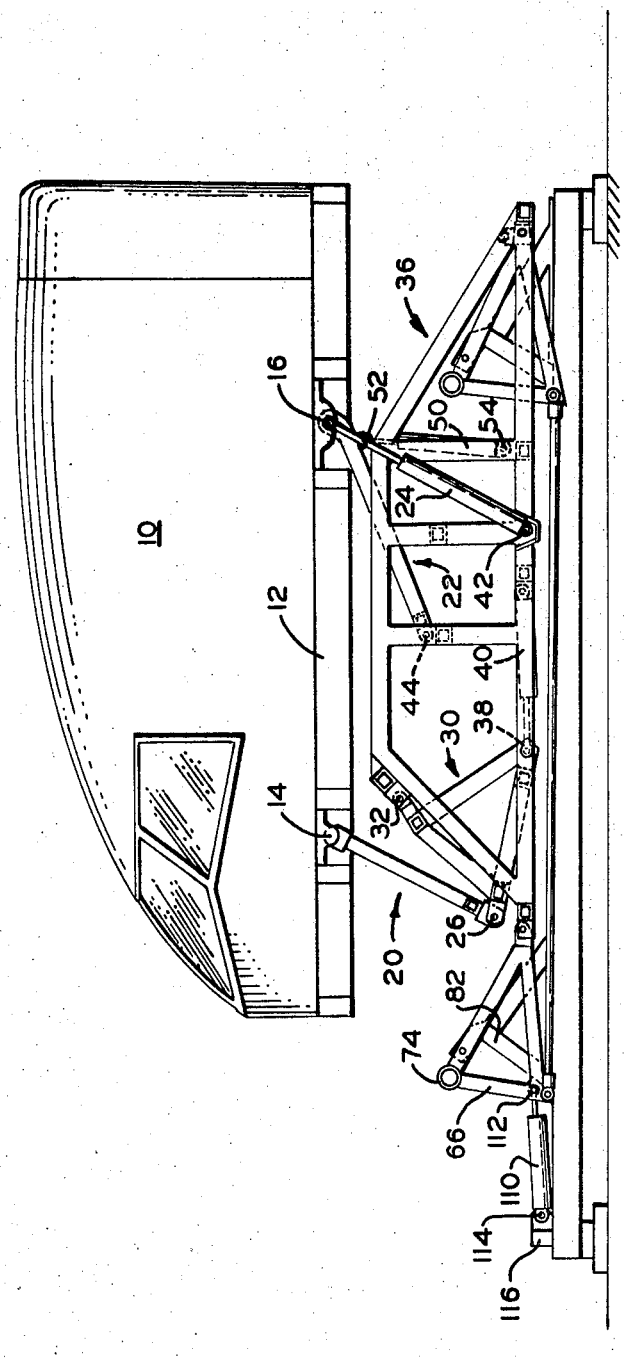
FIG. 1 is a side elevational view showing an exemplary form of the invention with the apparatus in a rest or settled position.
Figure 4:
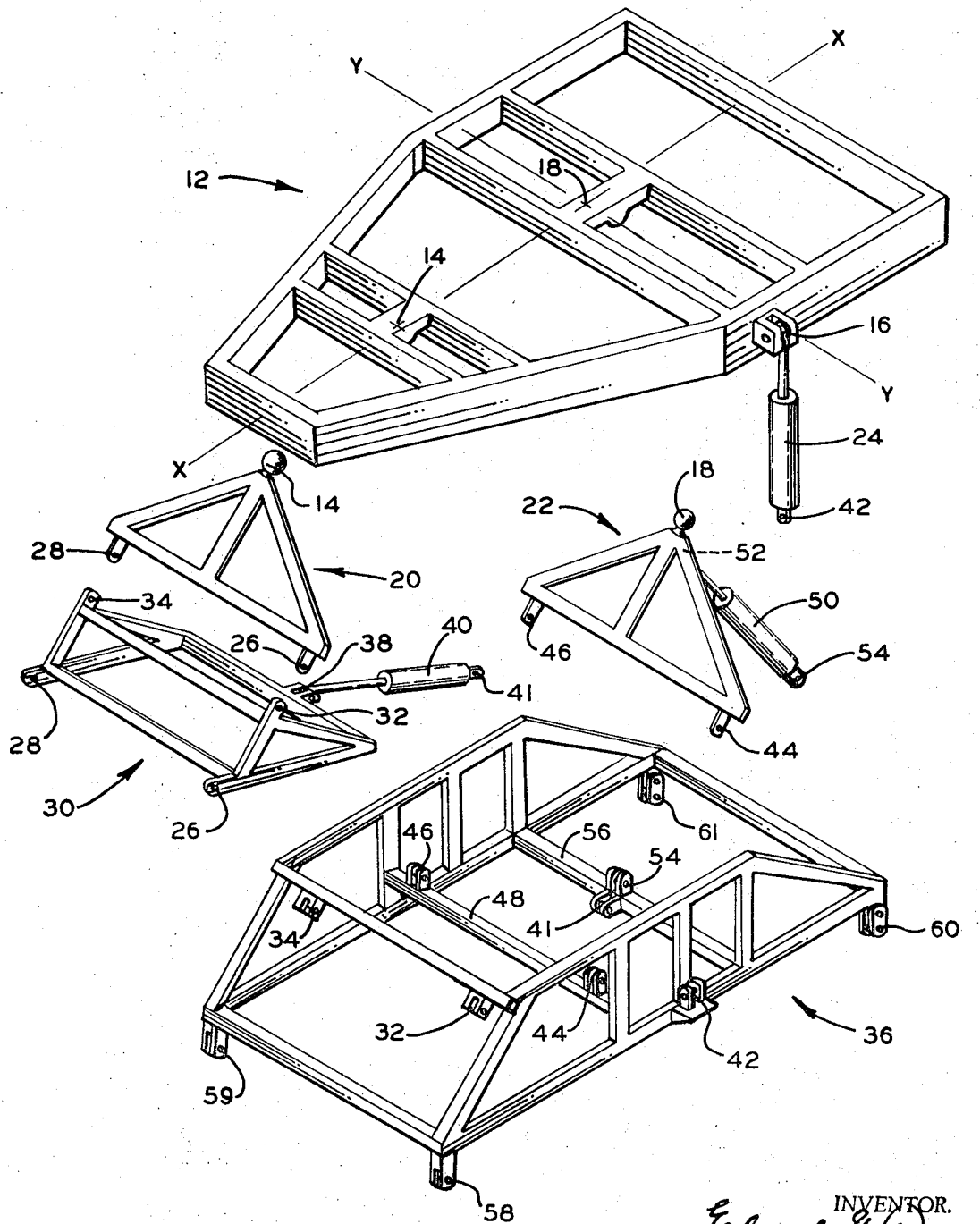
FIGS. 4 and 5 are exploded perspective views of selected elements of the apparatus shown in FIGS. 1—3.

A typical flight simulator cockpit of the type intended to provide the student station of the motion simulator is shown in FIG. 1 and indicated by the reference numeral 10. Cockpit 10 is fixedly secured to rigid platform 12 through which motions are transmitted to the student station. Platform 12 is supported at three points by means of suitable joints, such as ball and socket or two-axis gimbal joints, connecting the platform to other rigid elements. The three points of support of platform 12 are best seen in FIG. 4, where they are indicated by the reference numerals 14, 16 and 18. Point 14 lies on the longitudinal axis of the platform, indicated by the line X-X, point 16 lies on a transverse axis, indicated by the line Y-Y, and point 18 lies at the intersection of the two axes. The common designations "roll" and "pitch" will be used hereinafter to refer to movements of platform 12 about the X and Y axes, respectively, and to describe elements used to produce such motions.

The platform is supported at points 14 and 18 by A-frame structures, indicated generally by the reference numerals 20 and 22, and at point 16 by the movable end portion of the piston rod of hydraulic cylinder 24, comprising a portion of the linear actuator system by which roll motion of platform 12 is implemented. A-frame 20 extends from its connection at point 14 (indicated in FIG. 4 both on the platform and the A-frame) with platform 12 to a pair of pivoted connections 26 and 28 with transfer truss 30. A-frame 20 and truss 30 form a mechanical linkage through which pitch motion is transmitted to platform 12. Truss 30 is pivotally connected at points 32 and 34 to vertical translation truss 36, and is further pivotally attached at point 38 to the end of the piston rod of pitch cylinder 40, the other end of which is pivotally attached at 41 to a support on truss 36. Roll cylinder 24 is likewise pivotally supported at point 42 upon vertical translation truss 36.

A-frame 22 extends from its connection at point 18 (also indicated on both the platform and the A-frame) with platform 12 to a pair of pivotal connections 44 and 46 upon horizontal member 48 of vertical translation truss 36. Extensible cylinder 50 is attached at one end to A-frame 22 at point 52 and at the other end at point 54 to horizontal member 56 of vertical translation truss 36. Although roll cylinder 24 and pitch cylinder 40 are programmed, servoed actuators which produce controlled motion of platform 12 about axes X-X and Y-Y, respectively, extensible cylinder 50 is used merely for moving the support point 18 between two positions, as will be more fully explained hereinafter. In one such position (FIG. 1) platform 12 is in a rest position with the power to all actuators turned off, and in the other (FIG. 2) the platform is in an operative position for movement under control of the actuators. Thus, there is no necessity for any control of the rate of movement of cylinder 50 which, in the proper sense, is not a motion actuator.

Figure 5:
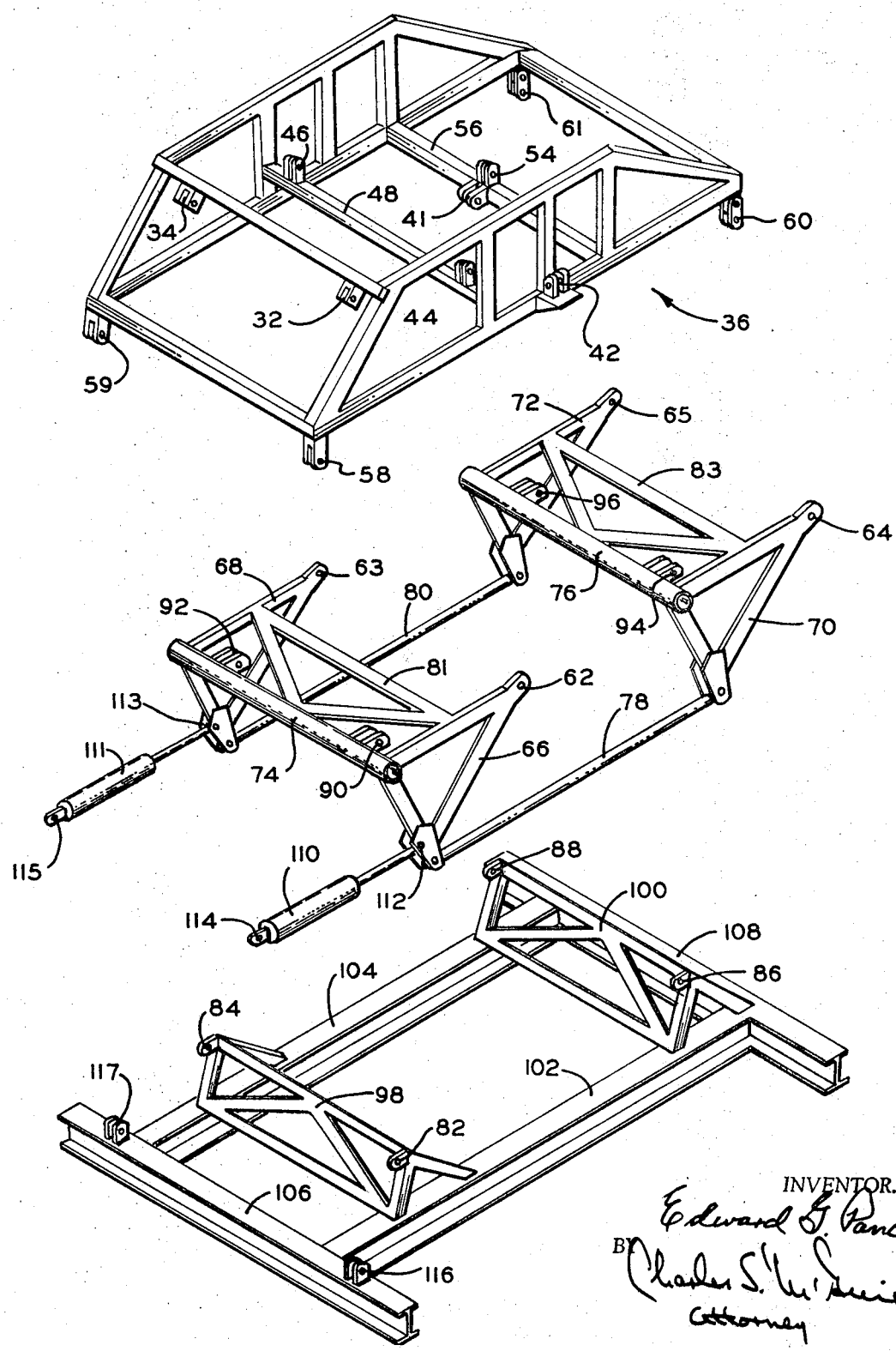

The mechanism by which vertical translation is imparted to platform 12 is shown in greater detail in FIG. 5. Vertical translation truss 36 is pivotally connected adjacent each of its four corners indicated by reference numbers 58, 59, 60 and 61, to respective points 62, 63, 64 and 65 on each of four rigid, triangular bellcrank members 66, 68, 70 and 72, respectively. While the bellcranks may be attached to fixed mountings at two of the corners (e.g., 58 and 59) of truss 36, mountings allowing some movement to compensate for slight fore-and-aft misalignment should be used at the other two corners (e.g., the shackle mountings shown at 60 and 61). The two forward bellcranks 66 and 68 are rigidly connected by torsion tube 74 and the two rear bellcranks 70 and 72 are connected by torsion tube 76. The torsion tubes are rigidly connected, e.g., by welding, to each of the bellcranks which they connect, whereby rotational movement of the bellcranks on either side is transmitted precisely to the corresponding bellcrank on the opposite side. Also, the forward and rear bellcranks 66 and 70 on one side of the apparatus are tied together by tension rod 78 which is pivotally attached at its opposite ends to portions of the bellcranks. Likewise, bellcranks 68 and 72 on the opposite side of the apparatus are tied together by tension rod 80 in the same manner. Truss structure 81 and 83 provide lateral rigidity between the front and rear pairs of bellcranks, respectively. The four bellcranks are pivotally mounted upon fixed supports 82, 84, 86 and 88 by means of fixed brackets 90, 92 on torsion tube 74 and fixed brackets 94 and 96 on torsion tube 76. Forward fixed supports 82 and 84 are connected by rigid truss structure 98, and rear fixed supports 86 and 88 are connected by truss structure 100. The fixed supports may be attached to the floor or to other suitable base support structure such as longitudinally extending I-beams 102 and 104, and laterally extending I-beams 106 and 108. Vertical translation cylinders 110 and 111 have their movable ends pivotally secured at 112 and 113 to bellcranks 66 and 68, respectively, pivotally attached at the other ends 114 and 115 to fixed mountings 116 and 117 on I-beam 106. It will be noted that although torsion tubes 74 and 76 enhance the structural rigidity they do not add to the weight which must be lifted in order to elevate platform 12 since they move downwardly as the platform is elevated.

The structure thus far disclosed is suitable for providing motion in 3° of freedom to platform 12, and therefore to student station 10. As shown in FIG. 1, platform 12 is in the rest or settled position with cylinders 24, 40 and 110 in their fully retracted positions. Likewise, erecting cylinder 50 is in its fully retracted position and platform 12, due to the geometric relationships of the cylinders and other structural elements, is in a level position wherein power to the actuators may be turned off. Simultaneous extension of erecting cylinder 50, and pitch and roll cylinders 40 and 24 will move platform 12 to the position shown in FIGS. 2 and 3. In this position, erecting cylinder 50 is fully extended, but the pitch and roll cylinders are extended only to such an extent that they are capable of producing motion of platform 12 to the desired extent in both directions about each of axes X-X and Y-Y. In moving from the settled to the erected position, extension of cylinder 50 is transmitted through A-frame 22 to elevate support point 18 of platform 12, while extension of pitch cylinder 40 is transmitted through truss 30 and A-frame 20 to elevate support point 14, and extension of roll cylinder 24 directly elevates support point 16.

Figure 2:
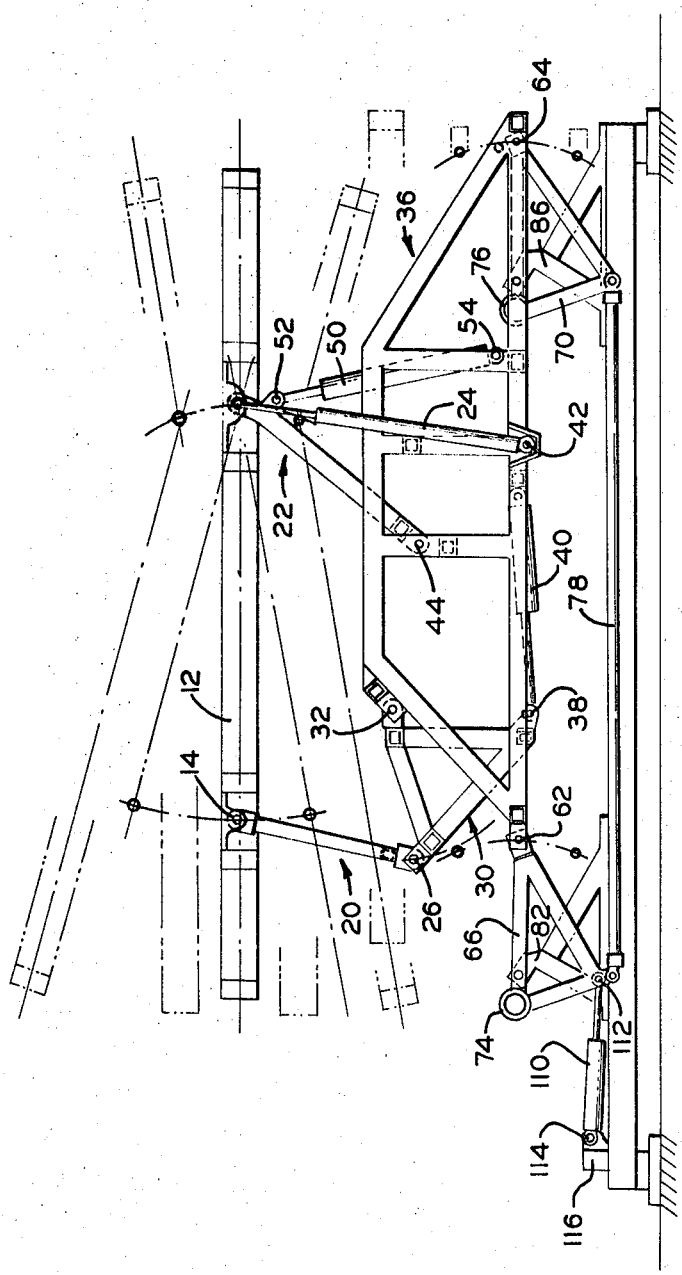
FIG. 2 is a side elevation, as in FIG. 1, showing the apparatus in an erected or operational position, with a number of possible positions of the motion platform shown in dot dash lines.
Figure 3:
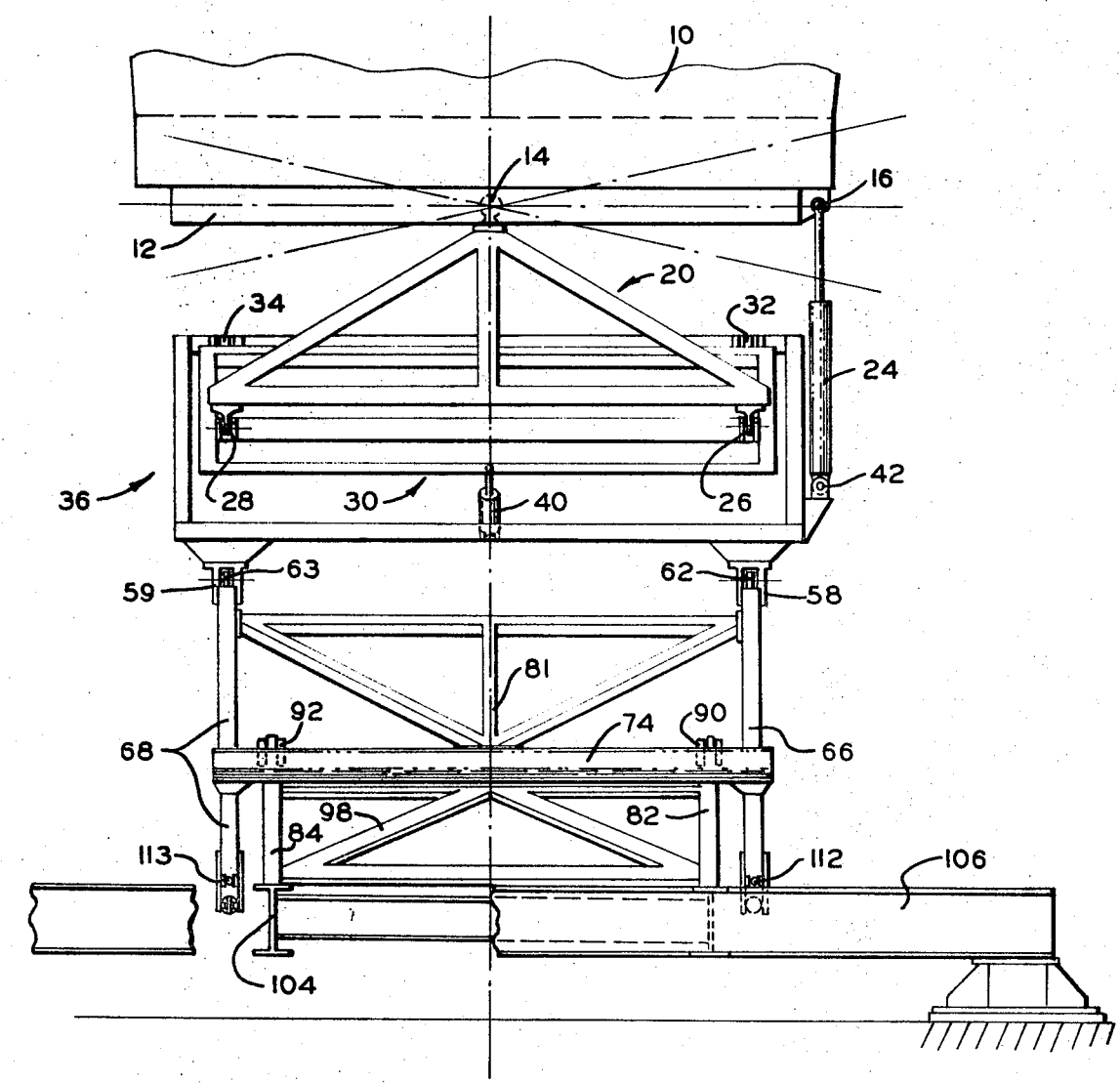
FIG. 3 is a front elevation of the apparatus of the invention shown in an elevated position.

Before commencing any controlled motion program for cockpit 10 vertical translation cylinders 110 and 111 would be extended from their fully retracted positions to an intermediate position from which both elevation and descent of platform 12 along the vertical axis could be achieved. As may be readily seen from the drawings, equal extension of cylinders 110 and 111 revolves all of bellcranks 66, 68, 70 and 72 an equal extent about their respective pivotal mountings in a counterclockwise direction as seen in FIGS. 1 and 2. Such rotation will directly elevate vertical translation truss 36, and thereby platform 12 and cockpit 10. Descent of the platform may be achieved by counter rotation of the bellcranks as cylinders 110 and 111 are retracted. The pivotal mounting of fixed ends 114 and 115 of cylinders 110 and 111 allows arcuate movement of the other ends about the pivotal mountings of the bellcranks on fixed mounts 82 and 84. Since the bellcrank members which transmit movement of cylinders 110 and 111 to truss 36 are tied together to form a structurally closed-loop system, there is essentially no uneven backlash or lost motion in the vertical translation system from side to side or front to rear. Any unevenness in motion of cylinders 110 and 111, for example, due to leakage of fluid past a cylinder, will be compensated for by torsion tubes 74 and 76. This linkage also simplifies "ganging" of vertical translation actuators, such as cylinders 110 and 111 (and others, if desired), as well as the addition of balance cylinders connected to bellcrank 70 and/or 72. Likewise, pitch and roll cylinders may be ganged, or balance cylinders added. Since ganged cylinders may be actuated with the same servovalve, the problems associated with synergistic actuators do not arise. It will be noted that although vertical motion of platform 12 may be implemented through simultaneous extension or retraction of erecting cylinder 50 and pitch and roll cylinders 40 and 24, such motion would require synergism of these three actuators, which is a feature specifically avoided by the present motion system.

It will also be readily apparent to those skilled in the art that motion in the other three axes of freedom, in addition to the three disclosed, may easily be added to the system. For example, translational motion along the X and Y axes of the entire apparatus, and thereby of cockpit 10, could be achieved by mounting the I-beams of the base section upon suitable rollers, air bearings, or the like. Rotation about a vertical axis through point 18 (i.e., yaw motion) may be achieved by mounting the support for the ball joint of A-frame 20 in a slider block laterally movable with respect to the remainder of platfrom 12 and mounting an actuating cylinder between the slider block and one side of the platform. A limited amount of fore-and-aft horizontal translation, sufficient for most purposes, may be achieved in a like manner by mounting the support for the ball joint of A-frame 22 in a slider block movable along the X axis and adding an actuator to effect such movement. Although support point 14 will move in a slight arc during such fore-and-aft motion, the ball joint of A-frame 20 would be near the top of the arc at all times with the illustrated geometry and any pitch motion would be imperceptible.

I claim:
1. A motion simulator comprising:
 a. a platform movable between operative and inoperative positions;
 b. a pivot point at which said platform is supported and about which it is rotatable in at least two axes of freedom when in said operative position;
 c. independently operable, extensible and retractable actuators for imparting said rotation about said pivot point in each of said two axes of freedom; and
 d. a hydraulic cylinder linked to said platform at said pivot point and movable between extended and retracted positions for moving said pivot point between a first position to place said platform in said operative position, wherein said actuators may be extended and retracted to impart controlled motion to said platform, and a second position to place said platform in said inoperative position, wherein said actuators are all fully retracted and said platform is in a desired orientation.

2. The invention according to claim 1 wherein said actuators comprise a pair of hydraulic cylinders each linked to said platform at points spaced from said pivot point and lying on perpendicular axes which intersect at said pivot point.

3. The invention according to claim 1 wherein said desired orientation comprises a substantially level, horizontal position of said platform.

4. The invention according to claim 3 wherein said platform, when in said operative position, may be placed in a substantially level, horizontal position parallel to and elevated from said desired orientation when in said inoperative position.

5. The invention according to claim 4 and further including additional extensible and retractable actuator means operative to move said platform in a third, vertical translation, axis of freedom with said hydraulic cylinder in said extended position.